(12) United States Patent
Hoyt

(10) Patent No.: US 6,628,469 B1
(45) Date of Patent: Sep. 30, 2003

(54) APPARATUS AND METHOD FOR LOW POWER HDD STORAGE ARCHITECTURE

(75) Inventor: Roger F. Hoyt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 09/613,204

(22) Filed: Jul. 11, 2000

(51) Int. Cl.⁷ .............................................. G11B 19/02
(52) U.S. Cl. ...................................................... 360/69
(58) Field of Search ............................. 360/75, 73.03, 360/78.12, 69, 71; 711/114

(56) References Cited

U.S. PATENT DOCUMENTS

| | | | |
|---|---|---|---|
| H1221 H | 8/1993 | Best et al. ................ | 360/97.01 |
| 5,237,466 A | * 8/1993 | Glaser et al. ............. | 300/73.03 |
| 5,422,767 A | 6/1995 | Hatchett et al. ......... | 360/98.01 |
| 5,583,716 A | * 12/1996 | Akiba et al. ............. | 360/99.01 |

FOREIGN PATENT DOCUMENTS

| | | | | |
|---|---|---|---|---|
| EP | 0 671 741 A2 | 9/1995 | ............ | G11B/25/04 |
| JP | 63-236113 | 10/1988 | ............. | G06F/1/00 |
| JP | 05-145876 | 6/1993 | ............ | G11B/19/00 |
| JP | 05-298810 | 11/1993 | ............ | G11B/19/02 |
| JP | 05-325496 | 12/1993 | ............ | G11B/25/04 |
| JP | 06-004979 | 1/1994 | ............ | G11B/19/00 |
| JP | 06-084338 | 3/1994 | ............ | G11B/33/12 |
| JP | 0671741 A2 | * 9/1995 | | |
| JP | 10-255451 | 9/1998 | ............ | G11B/33/00 |

* cited by examiner

*Primary Examiner*—David Hudspeth
*Assistant Examiner*—Mitchell Slavitt
(74) *Attorney, Agent, or Firm*—Ohlandt, Greeley, Ruggiero & Perle, L.L.P.; Robert Martin (57) ABSTRACT

An apparatus and method for a low power consuming disk drive unit comprising multiple HDD subsystems having spindles and associated disk platter(s) supported thereon, read-write heads and actuators for positioning the read-write heads. The disk platter(s) of each HDD subsystem may differ in diameter, rate of rotation and formatting. The method by which the disk drive unit operates to reduce the power requirements of the disk drive unit is to have the controller selectively power the smaller/more efficient HDD subsystem the majority of the time to store frequently accessed information and not to power the multiple larger/less efficient HDD subsystems that store the less frequently accessed information, thereby achieving reduced power needs for the disk drive unit.

23 Claims, 5 Drawing Sheets

APPARATUS AND METHOD FOR LOW POWER HDD STORAGE ARCHITECTURE

FIELD OF THE INVENTION

This invention relates to electrically powered disk storage units and, in particular, to a low power consuming magnetic hard disk storage unit having multiple spindles and associated magnetic disks.

BACKGROUND OF THE INVENTION

A hard disk drive (HDD) unit typically comprises a spindle, at least one disk platter rotatably supported by the spindle, at least one read-write head for reading/writing information from and to the disk platter(s), actuators for accurately positioning the read-write head(s) relative the disk platter(s) and an electronic controller for controlling the operation of the HDD. Various innovations have led to dramatic increases in the storage capacity and performance of (HDD) units and the miniaturization to smaller form factors. The storage capacity of HDDs has grown rapidly, historically exhibiting growth rates of 50 to 60% per year while showing growth rates of 130% per year in recent years. Almost as dramatic is the continuing reduction of the average cost per megabyte accompanying the increasing HDD capacities. The increased storage capacities and lower prices of HDDs have helped spur the proliferation of applications and devices using HDDs. While the storage capacities and costs of HDDs have improved, HDDs remain relatively power hungry as compared to other computer hardware devices. Furthermore, the power consumption requirements of HDDs is increasingly becoming more of a concern as the applications and devices using HDDs grow, especially for portable and mobile devices that rely on limited power sources such as batteries.

Of all the components comprising the typical disk drive unit, powering the rotation of the disk unit's spindle is the single largest consumer of power. HDDs also require a greater amount of power during their startup since initiating the rotation of the magnetic disk platter(s) typically induces a current spike exceeding the normal operational power requirements of the HDD.

Attempts at reducing the -power consumption needs of a disk drive unit include reducing the size, particularly the diameter, of the magnetic disk platter(s). Less torque and power is typically required to initiate, maintain and stop the rotation of disk platter(s) having smaller diameters as compared to larger diameter disk platter(s). A disadvantage with decreasing the diameter of the disk platter(s) is that the readable/writeable surface area of disk platter(s) also decreases. While increases in areal density and decreases in recordable bit sizes continue to be researched and developed so that more data may be read-written onto smaller spaces, disk platter(s) having smaller diameters are capable of storing less data than similarly formatted larger diameter disk platter(s).

Another factor impacting the power consumption needs of a HDD is the rate of rotation for a spindle and the disk platter supported thereon. More power is generally required to rotate a disk faster than to rotate the same disk at a lower rate of speed. Currently, HDDs having rotation rates of 10,000 revolution per minute (rpm) are installed on desktop computers, and 5,000–7,000 rpm HDDs are used in laptop computers.

Therefore, more than continued miniaturization of HDD components is needed to achieve HDD power reductions while not sacrificing HDD performance or capacity.

It is known in the prior art to reduce the power consumption needs of a disk drive unit by reducing the diameter of the disk drive unit's magnetic disks and starting only one disk at startup. European Pat. No. 671,741, published Sep. 13, 1995 entitled "A Small Memory Unit With A Hard Disk", discloses housing either two 1.3", three 1.0" or four 0.7" diameter magnetic platters in the same housing originally intended for a single 1.8" diameter magnetic disk platter. Activating only one disk at the time of starting the disk operation reduces power consumption.

It is further known to house several smaller disk drives in a housing originally intended for a larger disk drive device. Japanese Pat. No. 6-084338, published Mar. 25, 1994 entitled "Array Type Recording Device" discloses an array type configured disk storage device comprising multiple disk array units, each housed in standard sized 5.25" enclosures for incorporating the array type disk array device in personal computers, etc. having standard 5.25" computer expansion slots.

It is known to control the power consumption of a disk drive unit based on sequence control. Japanese Pat. No. 10-255451 published Sep. 25, 1998 entitled "Method for Supplying Power to Hard Disk" discloses a power supply having a control function for controlling the power supplied to a plurality of HDDs based on sequence control.

It is known to provide multiple disk spindles on a single baseplate. Japanese Pat. No. 5-325496 published May 26, 1994 entitled "Disk Device" discloses a disk storage device having two spindles on a single baseplate. The power consumption needs of the disk drive unit are reduced by an electric power control circuit that smoothes the power supply requirements of the disk drive unit.

SUMMARY OF THE INVENTION

The inventor has realized that a great majority of the information stored on hard disk drives, HDDs, is not frequently accessed for read-write purposes. Instead, only a relatively small percentage of a HDD is typically used to store the most frequently used data, such as commonly used operating system, data files, applications programs and modest data sets.

The present invention results from the further realization by the inventor that a low power consuming disk drive unit is effectuated by a disk drive unit having multiple HDDs and/or HDD subsystems of differing power consumption requirements and functioning as an integrated unit wherein only the more energy efficient HDD subsystem is selectively powered the majority of the disk drive unit's operating time. As used herein, a HDD subsystem typically comprises at least one spindle, at least one disk platter rotatably supported by the spindle, at least one read-write head for reading/writing information from and to the disk platter(s), actuators for accurately positioning the readwrite head(s) relative the disk platter(s) and associated electronics and electronic controller which may be shared with other HDD subsystem (s). The more efficient HDD subsystem has smaller diameter disk platter(s) than the less efficient HDD subsystem(s), although other factors may also influence the power efficiencies of the HDDs. The multiple HDDs of the present invention function as an integrated device. The combined total storage capacity of the multiple HDD subsystems is typically comparable to, if not greater than, a conventional disk drive unit. Accordingly, the disk drive unit of the present invention has lower power consumption requirements without sacrificing performance or storage capacity.

The low power consuming disk drive unit comprises multiple HDD subsystems having different power consumption needs. Each HDD subsystem typically comprises a spindle, at least one disk platter rotatably supported by the spindle, at least one read-write head for reading/writing information from and to the disk platter(s), actuators for accurately positioning the read-write head(s) relative the disk platter(s) and an electronic controller for controlling the operation of the HDD subsystem. The smaller/more efficient HDD subsystem comprising the disk drive unit is typically used to store the most commonly accessed data while the less efficient/larger HDD subsystem (s) stores the less frequently accessed information. Note that, as used throughout this document, accessing information on a HDD and/or HDD subsystem encompasses both reading and writing information on a HDD.

Although smaller, the more efficient HDD subsystem is sufficiently sized to store the frequently accessed information so that there is no compromise in the disk drive unit's performance. Since the smaller/more efficient HDD subsystem, stores the frequently used information, it is the smaller/more efficient HDD that is powered the majority of the time. The electronic controller controls the powering of the HDD subsystems and selectively powers only the smaller/more efficient HDD subsystem the majority of the time. Thus, the present disk drive unit achieves a reduction in power consumption needs.

The disk drive unit is also able to maintain the functionality, both capacity and performance, of a conventional disk drive unit having a single large HDD. The smaller/more efficient HDD subsystem stores the most frequently accessed information and typically has a faster seek time performance due to the smaller diameter of the disk platter(s). The larger/less efficient HDD subsystem(s) stores the less frequently accessed information. Combined, the smaller/more efficient HDD subsystem and the larger/less efficient HDD subsystem(s) may provide a storage capacity at least equal to, if not greater than, the storage capacity of a disk drive unit having a similarly formatted single large HDD. Additionally, the disk drive unit of the present invention is capable of improved performance since the most frequently accessed information is stored on the smaller HDD subsystem having improved seek time performance, as compared to a disk drive unit having a single large HDD similarly formatted. Therefore, the present invention provides a low power disk drive unit having reduced power consumption requirements and improved performance and capacity capabilities.

DETAILED DESCRIPTION OF THE INVENTION

Figure 1:
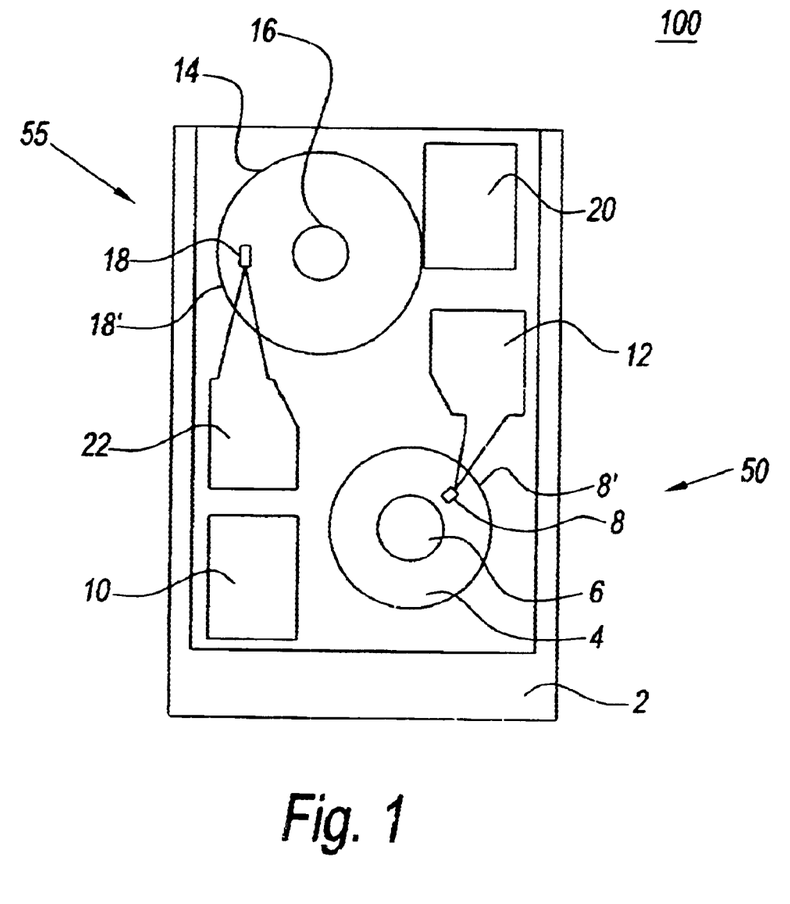
FIG. 1 is a preferred embodiment of a disk drive unit encompassing the present invention having two HDD subsystems of differing power consumption needs, the more power efficient HDD subsystem having a smaller disk platter.

Referring to FIG. 1, a preferred embodiment of the disk drive unit of the present invention is shown at 100. The preferred embodiment disk drive unit 100 is just one embodiment of the present invention. It is to be understood that this and other embodiments described below are illustrative examples of the present invention and not limitations on the invention. Still referring to FIG. 1, the disk drive unit 100 comprises a plurality of HDD subsystems of different power requirements. Each of the HDD subsystems comprising the disk drive unit are fully functional HDD subsystems capable of reading and writing information to each of the HDD subsystem's disk platter(s). Each of the HDD subsystems is a self-contained subsystem. In the preferred embodiment of FIG. 1, the disk drive unit 100 comprises two HDD subsystems, namely a HDD subsystem 50 and a HDD subsystem 55 enclosed in housing 2. The HDD subsystems 50, 55 each comprise a spindle and an associated disk platter(s), an actuator and a controller. The HDD subsystem 50 comprises a spindle 6 that rotatably supports at least one disk platter 4. The actuator 12 positions the read-write head 8 in the proper position relative to the disk platter 4 for read-writing information to the disk platter 4, as instructed by the controller 10. The HDD subsystem 55 likewise comprises a spindle 16 that rotatably supports at least one disk platter 14. The actuator 22 positions the read-write head 18 in the proper position relative to the disk platter 14, for read-writing information to the disk platter 14 as instructed by the controller 20.

Note that the spindle 6 and the spindle 16 are shown as each rotatably supporting only one disk platter 4 and 14, respectively. This is done primarily for purposes of clarity in the drawings, and is in no way a limitation on the invention, since each HDD subsystem may further comprise more than one disk platter.

An important feature of the present invention is that the multiple HDD subsystems 50, 55 comprising the disk drive unit have different power requirements under normal operating conditions. In the preferred embodiment 100, the HDD subsystem 50 and 55 are similarly formatted. That is, the HDD 50 disk platter 4 and the HDD 55 disk platter 14 are formatted having similar areal densities (bits/inch$^2$) which is dependant on the bits per inch (e.g., (500–650 k) bits/inch) and track size (e.g., 20 k tracks/inch). The read-write heads 8 for the HDD subsystem 50 have read-write head sensitivities and capabilities similar to the read-write heads 18 of the HDD subsystem 55. Although not visible in FIG. 1, each of the HDD subsystems 50, 55 have two read-write heads— one above its associated disk platter and one below its disk platter as is typical of HDDs.

Figure 2:
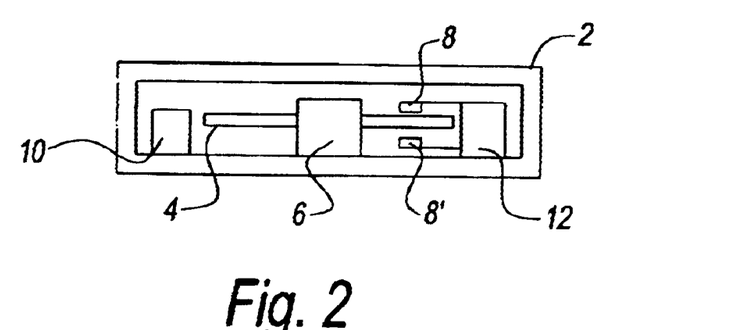
FIG. 2 is an end elevation view of the preferred embodiment of the disk drive unit encompassing the present invention.

A clearer understanding of the configuration of the read-write heads may be obtained by referring to FIG. 2 that shows an end view of the disk drive unit 100. As shown, there is a read-write head 8 located above the disk platter 4 and a read-write head 8' located below the disk platter 4. A read-write head 18 is located above and an opposing read-write head 18' (not visible but indicated) is located below the disk platter 14. See FIG. 1.

Although the HDD subsystems 50 and 55 of the preferred embodiment are similarly configured and formatted as explained above, this need not be the case. The aeral densities, track size, etc. may differ between the HDD subsystems. In the preferred embodiment, all of these parameters are similar for the sake of clarity and simplicity. The rate of rotation of the HDD subsystem 50 and the HDD subsystem 55 may also differ.

In the preferred embodiment the disk platter 4 of the HDD subsystem 50 has a smaller diameter than the disk platter 14 of the HDD subsystem 55. As noted above, the initiation and sustained rotation of a HDD spindle is usually the largest consumer of power in a HDD. In the preferred embodiment, the smaller size of the smaller platter 4 primarily accounts for the lower power consumption needs of the HDD subsystem 50 as compared to the HDD subsystem 55. The smaller diameter disk platter 4 may be 0.5 to 0.75 inches in diameter while the larger disk platter may be 2.5 to 3.5 inches in diameter, with diameters of 2.0 to 2.5 inches also being common. The amount of power required to rotate the smaller disk platter 4 is thus less than the power required rotate the disk platter 14. The peak currents induced upon startup of the smaller diameter disk platter 4 are also less than the peak currents induced upon startup of the HDD subsystem 55 larger disk platter 14. Thus, the HDD subsystem 50 is more power efficient than the HDD 55 subsystem.

An aspect of the present invention is that the power consumption needs of the HDD subsystems in the disk drive unit differ from each other so that only the more power efficient HDD subsystem is operated the majority of the time. It is possible to only operate the more efficient HDD in a disk drive unit having multiple HDDs of differing power requirements, without losing capacity and performance, due to the fact that most of the information (e.g., historical data, text files, images) accessed on a typical disk drive unit is only accessed infrequently. Conversely, a relatively small amount of the information (e.g., operating system, certain applications, etc.) typically accessed on a HDD is repeatedly and frequently accessed.

As a result of this fact, the most frequently accessed information for the preferred embodiment of the present invention is read-written to the smaller/more efficient HDD subsystem 50, while the less frequently accessed information is read-written to the larger/less efficient HDD subsystem 55. Accordingly, only the more power efficient HDD subsystem 50 of the preferred embodiment is powered the majority of the time that the disk drive unit 100 is in operation. The less power efficient HDD subsystem 55 is instead selectively powered up for operation infrequently since the information accessed on the HDD subsystem 55 is required to be accessed less frequently.

The HDD subsystem 50 and the HDD subsystem 55 typically have a combined storage capacity equal to, if not greater than, a disk drive unit having a single spindle/disk(s) HDD similarly formatted. The present invention read-writes the most frequently accessed information to the smaller/more efficient HDD subsystem 50 while the less frequently stored information is read-written to the larger/less efficient HDD subsystem 55. Although the HDD subsystem 50 has a smaller diameter, the HDD 50 subsystem is typically sufficiently sized so that all of the frequently accessed information may be adequately accessed on the HDD subsystem 50. The HDD subsystem 50 typically. has a storage capacity in the 1.0GB (gigabyte) range or greater. The storage capacity of the HDD subsystem 55 is typically on the order of three times the smaller HDD subsystem 50. Since the smaller/more efficient HDD subsystem 50 will be the only HDD subsystem of the invention normally powered, the disk drive unit of the present invention is more power efficient than a conventional single spindle disk drive unit.

Note that the representative values used above are merely examples compatible with the preferred embodiment and are not intended to be limitations on the invention. There may also be more than two HDD subsystems in the low power disk drive unit of the present invention.

The storage capacity values may be adjusted up or down in order to meet specific disk drive unit performance criteria. Wherein there has been a move towards bifurcation of the disk drive unit marketplace in order to accommodate the need for storage capacity versus the need for speed, the present invention may be implemented to serve the dual purposes of a large capacity HDD subsystem and a speedy HDD subsystem in applications where both characteristics are valued. Where speed is of the essence (i.e., customer service records) the information required to be accessed quickly may be stored on the smaller/more efficient HDD subsystem 50. Where storage capacity is the critical determinant (i.e., company historical files), the information being accessed less frequently and/or without an emphasis on speed may be stored on the larger/less efficient HDD subsystem. Therefore, the integrated HDD subsystems 50 and 55 of the present invention also provide expanded functionality as compared to conventional disk drive units.

The storing of the most frequently accessed information on a smaller/more efficient HDD subsystem, in accordance with an aspect of this invention, is employed as well in the multiple HDD subsystem disk drive unit, notwithstanding the number HDD subsystems actually used.

The disk drive unit of the present invention is also capable of improved performance as compared to a conventional single spindle disk drive unit since the most frequently accessed information is stored on the smaller HDD subsystem. This is true because HDD subsystem 50 typically has a faster seek time than a large conventional single spindle disk drive unit. That is, the read-write heads of the HDD subsystem 50 may be faster positioned over the disk platter 4 than a conventional large single spindle disk drive unit since the size of the disk platter 4 is reduced and the read-write heads have a smaller range of motion over which to travel.

The capability of the present invention to quickly find the most frequently accessed information also provides the benefit of improved performance in situations where the disk drive unit may be instructed to go to into a "sleep mode"—usually after a predetermined length of disk drive unit inactivity. The smaller/more efficient HDD subsystem 50 has a faster seek time performance than the HDD subsystem 55 (or a conventional single spindle disk drive unit). There is a high probability that the information required to be accessed immediately following a "sleep mode" will be stored on the smaller/more efficient HDD subsystem 50. Thus, there is typically a gain in performance when using "sleep mode" utilities with the present invention. Therefore, the present invention provides a disk drive unit having improved performance as compared to conventional disk drive units.

Figure 4A:
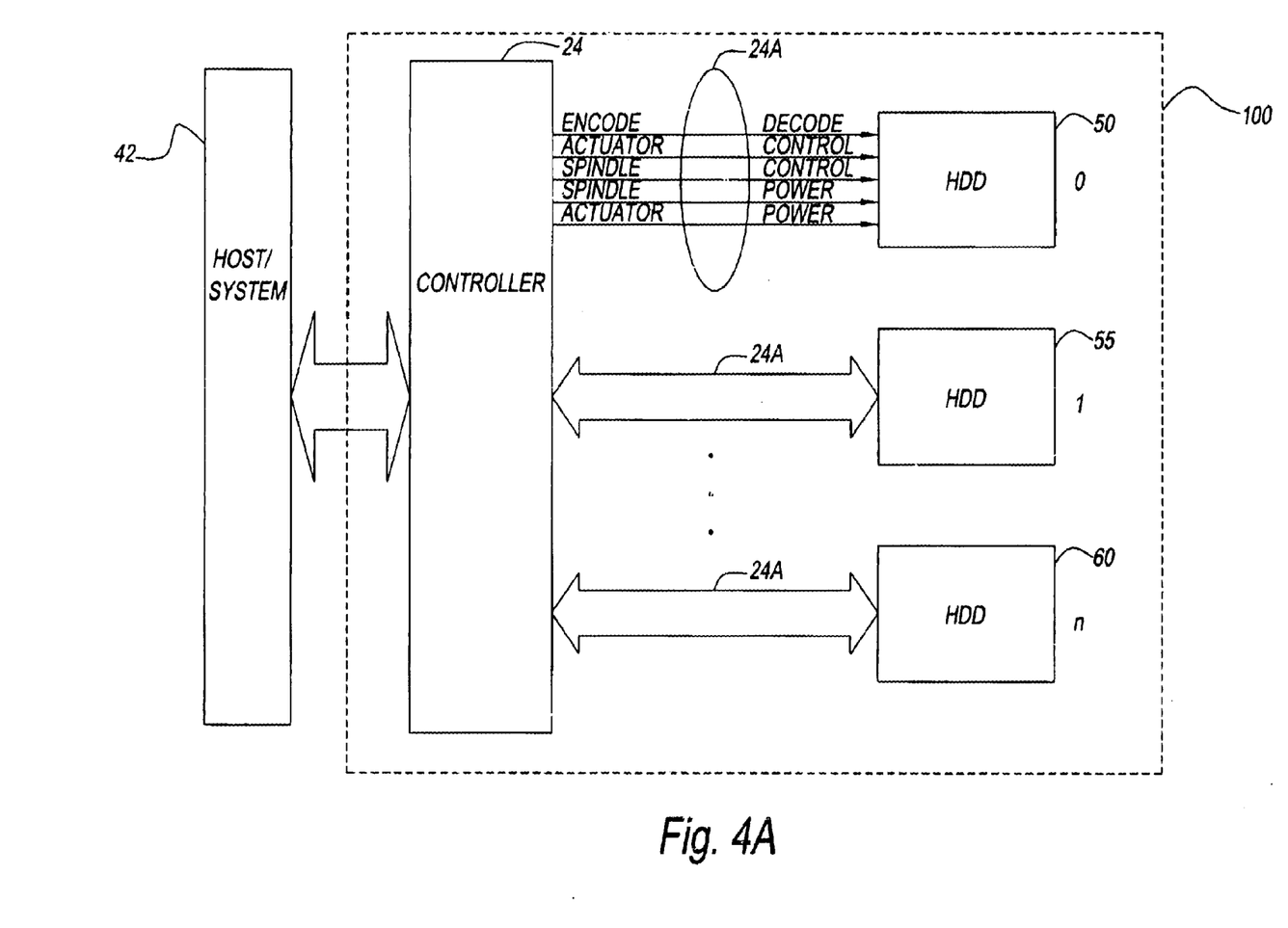
FIG. 4A is a functional block diagram illustrating the controller interface and multiple HDDs of the disk drive unit.

Another aspect of the present invention is that the controller 24 provides the functions for interfacing with an external host/system; data encoding and decoding; spindle motor control; actuator control; address signaling; status signaling; power control an other functions. A clearer understanding of the controller may be had by referring to FIG. 4A. The FIG. 4A is a modified embodiment of the disk drive unit 100 depicted in FIG. 1, with the modification being the disk drive unit 100 is not limited to only having two HDD subsystems 50 and 55. The disk drive unit 100 of FIG. 4A includes HDD subsystems 50, 55 and additional HDD subsystems as represented by HDD 60. The FIG. 4A shows the relationship of the controller 24 with respect to the other components of the disk drive unit 100. FIG. 4A shows a functional block diagram for the disk drive unit 100 having multiple HDD subsystems. The controller 24 preferably interfaces with multiple HDD subsystems located within one housing. In particular, it is important to note that the controller 24 provides the interface between the mechanical aspects of the invention and the external electrical host/system 42. The controller 24 interfaces with the external host/system 42 and provides control signals from the host/system 42 to the HDD subsystem through controller bus 24A that controls, among other features, the spindle 6, 16 (start/stop/increase/decrease rotation) and the actuator 12, 22 (position and velocity control) of the HDD subsystems 50 and 55 respectively. The HDD subsystem 60 is a functional equivalent of the other HDD subsystems 50 and 55 in the disk drive unit 100 and is shown in FIG. 4A to illustrate the scalability of the invention. The controller 24 also provides the interface with the external host/system 42 for the communication of data from the external host/system 42 to the read-write heads 24 so that the data may be read-written from and to the disk platter(s) of the multiple HDD subsystems. The HDD subsystems comprising the disk drive unit 100 are preferably addressable. This feature of the invention is illustrated in FIG. 4A by the address value 0 for HDD subsystem 50, the address value 1 for HDD subsystem 55 and the address value n for HDD subsystem 60.

Since one aspect of the present invention is the reduction of the power required by the disk drive unit, the power control function provided by the controller 24 is an important feature of the invention. The controller 24 selectively provides the commands that allow the powering of the smaller/more efficient HDD subsystem 50 and not the powering of the larger/less efficient HDD subsystem 55 of the disk drive unit 100 for the reduction of power requirements as described above. Accordingly, for a majority of the time that the disk drive unit operates, only the smaller/more efficient HDD subsystem 50 is selectively powered on. While the smaller/more efficient is selectively powered on, the larger/less efficient HDD subsystem 55 is selectively not powered since the more frequently accessed information is stored on the smaller/more efficient HDD subsystem 50. Conversely, the larger/less efficient HDD subsystem 55 is selectively powered on and the smaller/more efficient HDD subsystem 50 is selectively not powered for accessing the less frequently accessed information on the disk drive unit.

The HDD addresses 0,1, . . . n typically facilitate the partitioning of information amongst the HDD subsystems of the invention. The power control functions of the controller 24 operate in accordance with the earlier explanation of the power reducing aspects of the invention, whereby only the smaller/more efficient HDD subsystem 50 is powered the majority of the time and the larger/less efficient HDD subsystem 55 is powered only infrequently, as required to read/write the less frequently accessed data.

Figure 4B:
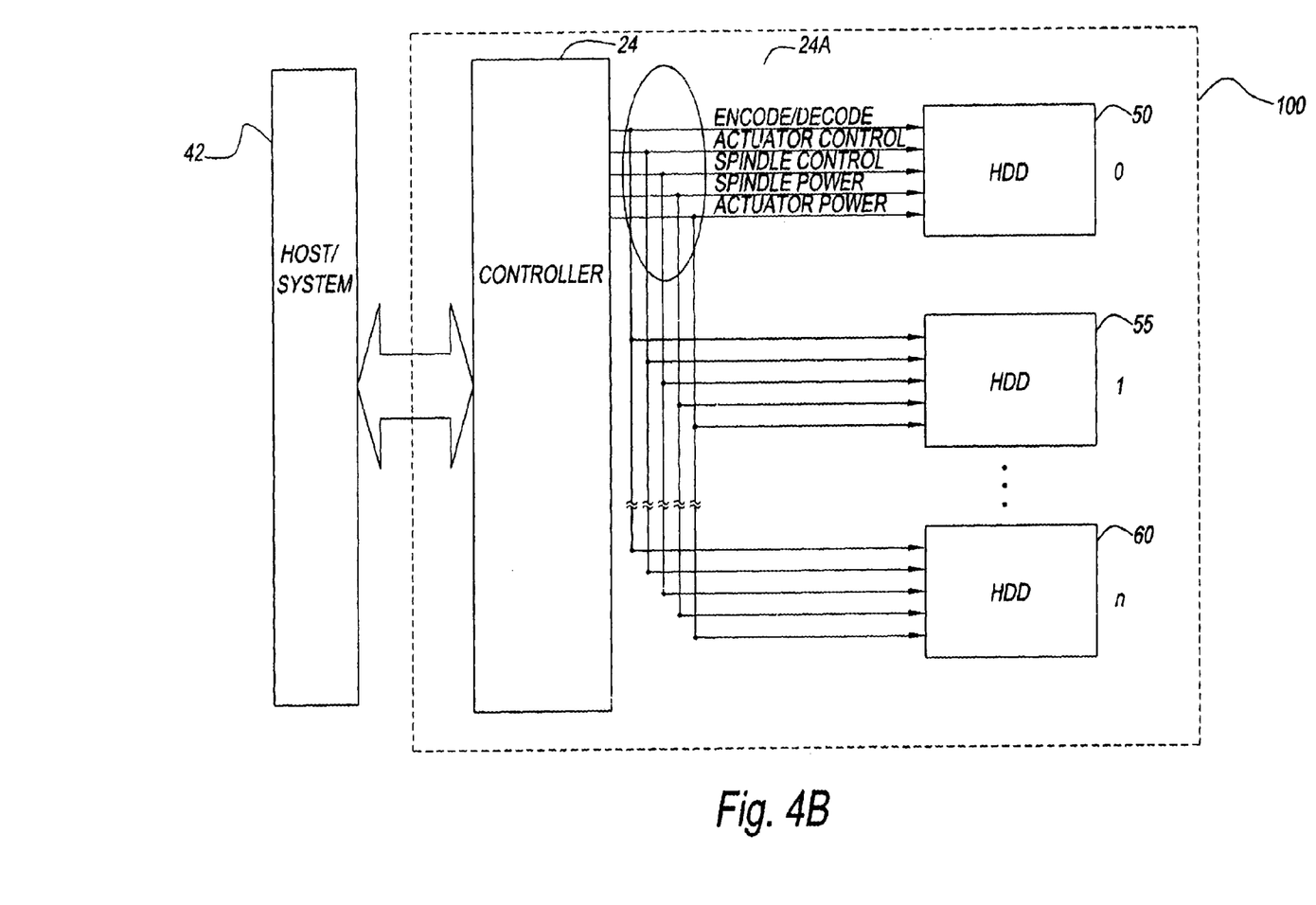
FIG. 4B is a functional block diagram illustrating the controller interface multiplex bus and multiple HDDs of the disk drive unit.

The FIG. 4B is an extension of the FIG. 4A. The primary difference between the two drawings being that controller 24 control bus 24A in FIG. 4A is a multiplexed bus in FIG. 4B. This is the preferable embodiment of the control bus 24A since the invention comprises disk drive units having multiple HDD subsystems.

Figure 5:
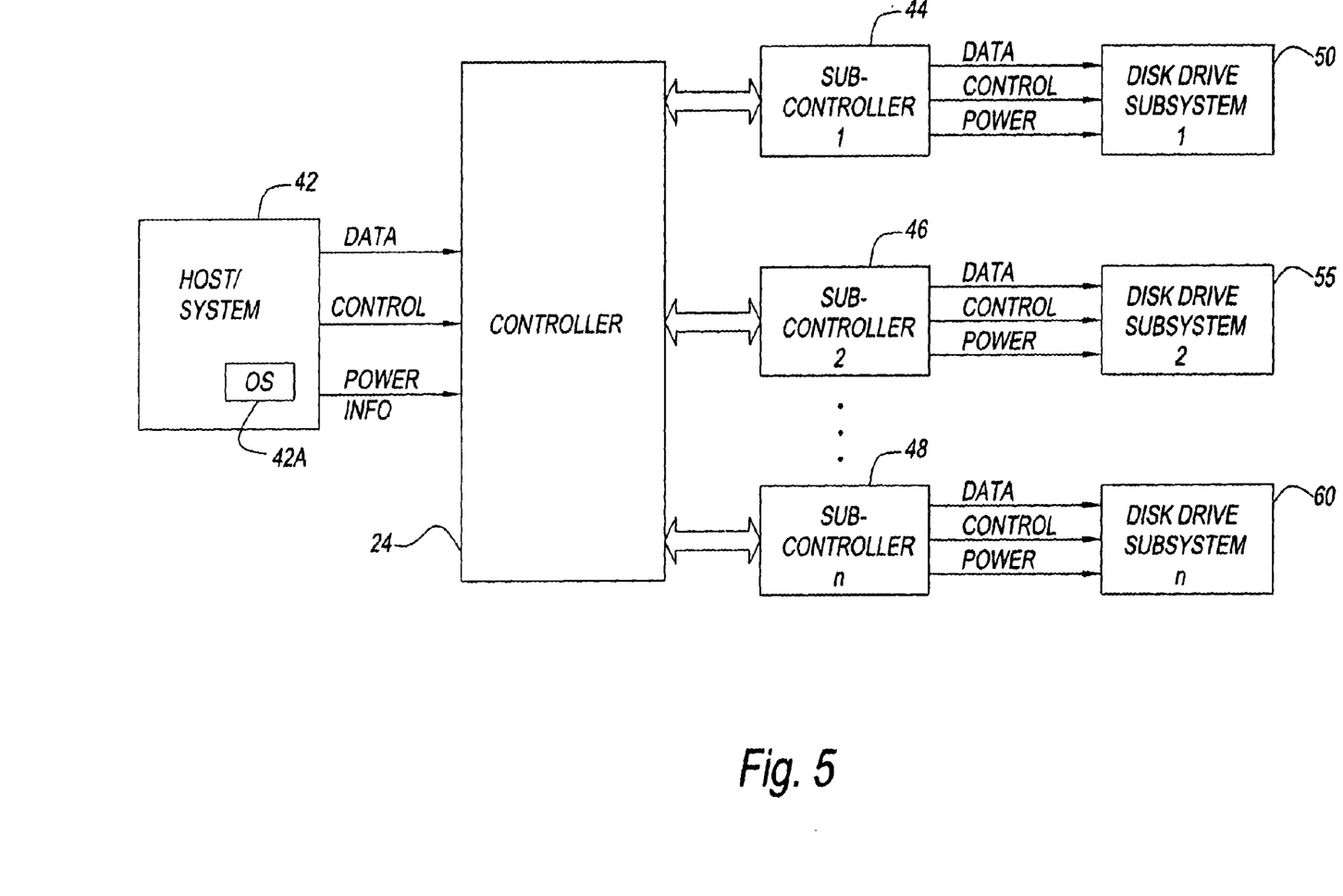
FIG. 5 is a functional block diagram illustrating the controller interface of the disk drive unit of an embodiment of the present invention wherein the controller commands sub-controllers.

As shown in FIG. 5, the controller 24 does not interface directly with the HDD subsystems. Instead, the controller 24 may interface with sub-controllers 44, 46, and 48, which in turn control the operation of the multiple HDD subsystems comprising an embodiment of the disk drive unit of the present invention. The controller 24 provides control, power and data signals to the sub-controllers 44, 46 and 48. The sub-controllers 44, 46 and 48 each provides control, power and data signals to the HDD subsystems 50, 55 and 60, respectively.

As part of the present invention, it is contemplated that the controller 24 may contain sufficient logic for the transfer of information from one HDD subsystem to another HDD subsystem within a given disk drive unit. In certain instances, it is desirable to have the ability to transfer data between the multiple HDD subsystems comprising the disk drive unit, e.g., disk caching. The ability to transfer data from one HDD subsystem to another HDD subsystem within the same disk drive unit is just one embodiment of the present invention. The ability to transfer data between HDD subsystems is not a requirement for the invention.

Figure 3:
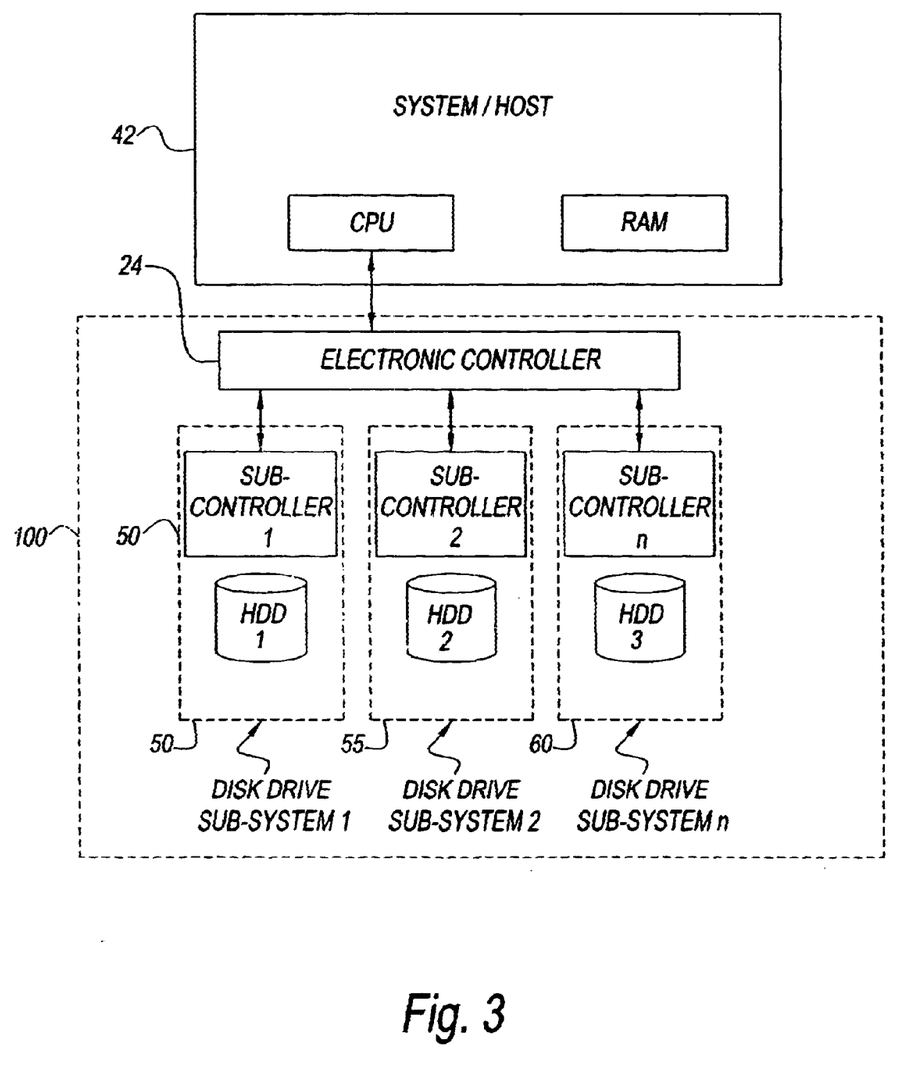
FIG. 3 is a diagram of a disk drive unit encompassing the present invention further including sub-controllers wherein the sub-controllers and associated HDD subsystems are each separately housed.

Another aspect of the present invention is the housing of the multiple HDD subsystems of the disk drive unit. The multiple HDD subsystems of the disk drive unit function as an integrated unit and are accordingly addressed by the external host/system as an integrated unit. The multiple HDD subsystems of the disk drive system may however be separately and individually housed. See FIG. 3. The multiple HDD subsystems may be individually housed for electrical and mechanical isolation purposes. Individually housing the HDD subsystems electrically isolates one HDD subsystem from others of the multiple HDD subsystems. Individually housing the multiple HDD subsystems for mechanical isolation purposes may be done to prevent problems associated with air turbulence generated by locating the rotating multiple HDD subsystem in the same housing. The read-write heads of HDDs typically ride on an extremely thin layer of air, and any air turbulence may compromise the read-write process. Air turbulence and vibration tends to increase as the rate of rotation increases. The individual housing and isolation of the HDD subsystems may not be desired or necessary in all embodiments of the present invention.

In FIG. 5 the host system is assumed to include an operating system (OS) 42A. The OS 42A is required for partitioning the information stored on the disk drive unit such that the frequently accessed data is stored on the smaller/more efficient HDD subsystems, while the less frequently accessed information is stored on the larger/less efficient HDDs in accordance with the invention. Any number of suitable algorithms could be used, such as placing all program files on the smaller/more efficient HDD subsystem 50 and all data files on the other HDD subsystems 55 and 60. In one embodiment, the larger capacity/less efficient HDD subsystem (s) are addressed by the host system as individual drives (e.g., A, B, C, etc.) and powered up and used only as required by the operator. Another embodiment of an automated algorithm detects when the smaller/more efficient HDD subsystem is reaching its storage capacity limit, and automatically writes additional data to the larger/less efficient HDD subsystem and updates the system records to maintain a record of the remaining storage capacity available on the larger/less efficient HDD subsystem.

It should be understood that the foregoing descriptions of the invention, while particularly shown and described with respect to preferred embodiments thereof, are only illustrative of the invention. By example, in an embodiment of the invention having five HDD subsystems, each of the five HDD subsystems may have different diameter disk platters. It will be understood by those skilled in the art that changes in form and details may be made therein without departing from the scope and spirit of the invention and the appended claims.

What is claimed is:

1. A disk drive unit, comprising:
a first hard disk drive (HDD) subsystem having a first spindle for rotatably supporting at least one first disk, said first disk having at least one associated read/write head;
a second HDD subsystem having a second spindle for rotatably supporting at least one second disk, said second disk having at least one associated read/write head, said first disk having a smaller diameter than said second disk and said first HDD subsystem having lower power consumption requirements than said second HDD subsystem; and
a controller for selectively operating only said first HDD subsystem and not said second HDD subsystem for reducing power consumption.

2. The disk drive unit of claim 1 further comprising a housing for enclosing said first HDD, said second HDD and said controller therein.

3. The disk drive unit of claim 1 further comprising a first sub-unit housing for separately and individually enclosing said first HDD subsystem therein and a second sub-unit housing for separately and individually enclosing said second HDD subsystem therein for purposes of electrically and mechanically isolating said first and second HDD subsystems.

4. The disk drive unit of claim 1 further comprising a first sub-controller receiving commands from said controller for selectively operating said first HDD subsystem and a second sub-controller receiving commands from said controller for not selectively operating said second HDD subsystem.

5. The disk drive unit of claim 1 wherein said controller further provides an interface between an external host/system and said first HDD subsystem and said second HDD subsystem.

6. The disk drive unit of claim 5 wherein the external host/system has an operating system for partitioning information that is stored on said first HDD subsystem and said second HDD subsystem.

7. The disk drive unit of claim 1 wherein said first HDD subsystem further comprises a first actuator for positioning said associated read/write head and said second HDD subsystem further comprises a second actuator for positioning said associated read/write head.

8. The disk drive unit of claim 1 wherein said spindle of said first HDD subsystem rotates at rate different than said spindle of said second HDD subsystem.

9. The disk drive unit of claim 1 wherein said disk of said first HDD subsystem has a different information storage capacity than said disk of said second HDD subsystem.

10. The disk drive unit of claim 1 wherein said controller further controls the transfer of information amongst said first HDD subsystem and said second HDD subsystem.

11. A low power consumption disk drive unit, comprising:
a housing;
a first HDD subsystem contained within said housing, having a spindle for rotatably supporting at least one first disk, said first disk having at least one associated read/write head;
at least one second HDD subsystem contained within said housing, having a second spindle for rotatably supporting at least one second disk, said second disk having at least one associated read/write head, wherein said first HDD subsystem has lower power consumption requirements than said at least one second HDD subsystem; and
a controller contained within said housing, for selectively operating said first HDD subsystem and not said at least one second HDD subsystem for reducing the power consumption requirements of the disk drive unit.

12. The low power consumption disk drive unit of claim 11 wherein said first HDD subsystem first disk has a smaller diameter than said at least one second HDD subsystem second disk.

13. The low power consumption disk drive unit of claim 11 wherein said first HDD subsystem has lower power consumption requirements than said at least one second HDD subsystem based, at least in part, on the rate of rotation of said first HDD subsystem's disk.

14. The low power consumption disk drive unit of claim 11 wherein said controller further provides an interface between an external host/system and said first and said at least one second HDD subsystems.

15. The low power consumption disk drive unit of claim 14 wherein the external host/system has an operating system for partitioning information that is stored on said first HDD subsystem and said at least one second HDD subsystem.

16. The low power consumption disk drive unit of claim 11 further comprising a plurality of sub-controllers, each receiving commands from said controller for selectively operating one each, said first HDD subsystem and said at least one second HDD subsystem.

17. The low power consumption disk drive unit of claim 16 further comprising a plurality of sub-unit housings, each of said sub-unit housings enclosing one of said first and said at least one second HDD subsystems and associated sub-controllers therein.

18. The low power consumption disk drive unit of claim 11 wherein said disks of said first HDD and said at least one second HDD subsystems are of different diameters.

19. The low power consumption disk drive unit of claim 11 wherein said spindles of said first HDD and said at least one second HDD subsystems rotate at different rates.

20. The low power consumption disk drive unit of claim 11 wherein said disks of said first HDD and said at least one second HDD subsystems have different information storage capacities.

21. The low power consumption disk drive unit of claim 11 wherein said controller further controls the transfer of information amongst said first HDD and said at least one second HDD subsystems.

22. A method for storing information on a disk drive unit, comprising the steps of:
storing the most frequently accessed information on a first HDD subsystem;
storing the less frequently accessed information on at least one second HDD subsystem; and
selectively powering said first HDD subsystem and not said at least one second HDD subsystem for reducing the power consumption requirements for the disk drive unit; wherein said first HDD subsystem has lower power consumption requirements than said at least one second HDD subsystem.

23. The method of claim 22 wherein each of said first HDD subsystem and said at least one second HDD subsystems are individually and selectively powered as needed.

* * * * *